(12) United States Patent
Olinger et al.

(10) Patent No.: US 10,855,787 B2
(45) Date of Patent: Dec. 1, 2020

(54) SYSTEMS AND METHODS FOR GENERATING CONTENT

(71) Applicant: Facebook, Inc., Menlo Park, CA (US)

(72) Inventors: Stephen Garrett Olinger, San Francisco, CA (US); Sachin Monga, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 161 days.

(21) Appl. No.: 15/856,389

(22) Filed: Dec. 28, 2017

(65) Prior Publication Data

US 2019/0208027 A1 Jul. 4, 2019

(51) Int. Cl.
*H04L 29/08* (2006.01)
*H04L 12/58* (2006.01)

(52) U.S. Cl.
CPC ............ *H04L 67/24* (2013.01); *H04L 51/043* (2013.01); *H04L 51/32* (2013.01); *H04L 67/18* (2013.01)

(58) Field of Classification Search
CPC .......... H04L 67/24; H04L 67/18; H04L 51/32
See application file for complete search history.

(56) References Cited

U.S. PATENT DOCUMENTS

| | | | |
|---|---|---|---|
| 8,510,288 B2* | 8/2013 | Mital | G06F 40/18 707/708 |
| 2010/0274847 A1* | 10/2010 | Anderson | G06Q 50/01 709/203 |
| 2015/0317809 A1* | 11/2015 | Chellappan | H04W 4/90 455/404.1 |

* cited by examiner

*Primary Examiner* — El Hadji M Sall
(74) *Attorney, Agent, or Firm* — Sheppard Mullin Richter & Hampton LLP

(57) ABSTRACT

Systems, methods, and non-transitory computer-readable media can receive, for a first user, a user status from a set of pre-determined user statuses. A set of media content items associated with the user status is identified. The first user is provided with the set of media content items for creating a visual status content item.

20 Claims, 12 Drawing Sheets

SYSTEMS AND METHODS FOR GENERATING CONTENT

FIELD OF THE INVENTION

The present technology relates to the field of content generation. More particularly, the present technology relates to techniques for creating and sharing digital content in a computer networking environment.

BACKGROUND

Users often utilize computing devices for a wide variety of purposes. Users can use their computing devices to, for example, interact with one another, access media content, share media content, and create media content. In some cases, media content can be provided by members of a social networking system. The media content can include one or a combination of text, images, videos, and audio. The media content may be published to the social networking system for consumption by others.

SUMMARY

Various embodiments of the present disclosure can include systems, methods, and non-transitory computer readable media configured to receive, for a first user, a user status from a set of pre-determined user statuses. A set of media content items associated with the user status is identified. The first user is provided with the set of media content items for creating a visual status content item.

In an embodiment, the set of media content items comprise at least one of a background image, a sticker, a frame, a mask, or a filter associated with the user status.

In an embodiment, the set of pre-determined user statuses comprise one or more location-based user statuses.

In an embodiment, the set of pre-determined user statuses comprise one or more emotion-based user statuses.

In an embodiment, the set of pre-determined user statuses comprise one or more media consumption user statuses.

In an embodiment, a first media content item being consumed by the first user is automatically identified.

In an embodiment, the first user is provided with a set of media content items associated with the first media content item.

In an embodiment, a list of media content items is pre-populated based on contextual information. The contextual information comprises date and time information.

In an embodiment, a visual status content item is received which comprises at least one media content item from the set of media content items.

In an embodiment, the visual status content item is published to an ephemeral story feed associated with the first user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
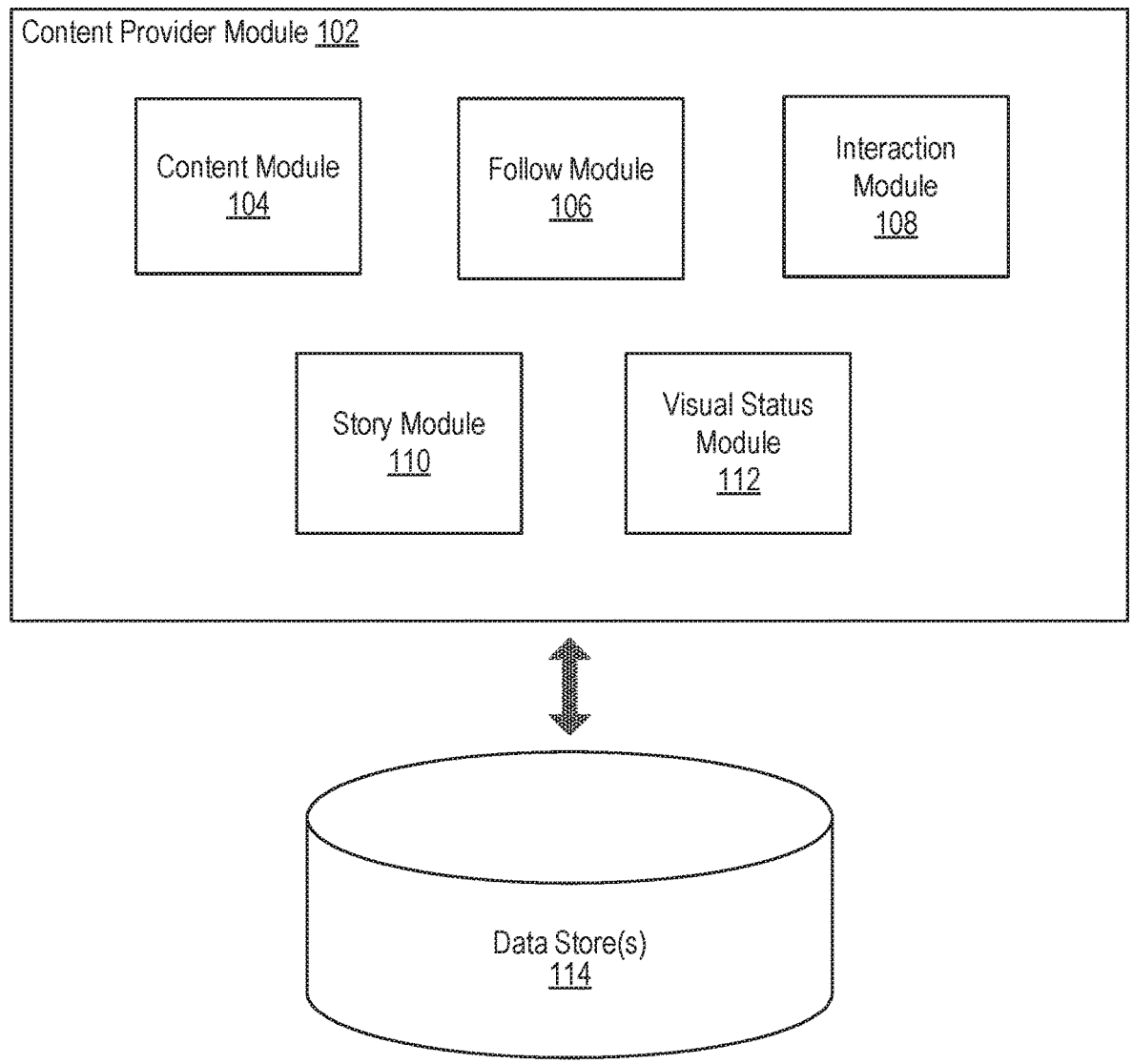
FIG. 1 illustrates an example system including a content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Generating Content

As mentioned, users often utilize computing devices for a wide variety of purposes. Users can use their computing devices to, for example, interact with one another, access media content, share media content, and create media content. In some cases, media content items can include postings from members of an online community or platform, such as a social networking system. The postings may include one or a combination of text, images, videos, and audio. The postings may be published to the social networking system for consumption by others. Under conventional approaches, media content items posted by a member can be included in a profile of the member on the social networking system. In other instances, media content items posted by the member can appear in respective media content feeds of other users who are members of the social networking system. The other users can be connections of the member who posted the media content items.

Under conventional approaches, users can create and publish content to a social networking system. Such posted content can include text, media (e.g., images, videos, audio), or a combination thereof. Other users can access the published content through the social networking system. Under conventional approaches, users may be provided with various features or tools to generate content. For example, these features and/or tools may be provided via a user interface on a mobile application or web browser. Users can interact with the user interface to generate content and publish it to the social networking system. However, conventional approaches for generating and sharing media content items can be burdensome for various reasons. For example, conventional approaches may provide tools or features for users to create compelling content based on interesting images or videos that the user is able to capture. This may lead to a scenario in which a significant portion of content on a social networking system comprises photos or videos captured by users. However, within this ecosystem, users may find it difficult or undesirable to generate and/or share content about the user when the user is performing a task or is otherwise engaged in an activity that is not easily or faithfully depicted through images or videos. As such, conventional approaches may lead to scenarios in which users only share content when they are participating in an activity they deem to be "photo-worthy." This can result in long periods of time when individual users are not generating or sharing any content.

An improved approach rooted in computer technology overcomes the foregoing and other disadvantages associated with conventional approaches specifically arising in the realm of computer technology. In general, users may be provided with tools and/or features to create visual status content items. A set of pre-determined user statuses may be provided for selection by a user. Each user status may be indicative of a status (or state) of the user at the time of posting. For example, a user status may indicate that the user is in a particular location or traveling from one location to another, that the user is performing and/or participating in a particular activity, that the user is in a particular emotional state of mind, that the user is watching and/or listening to a particular media content item, and the like. The set of pre-determined user statuses can be divided into a plurality of categories. For example, a location-based user status may indicate that the user is in a particular location or that the user is traveling from one location to another, an activity-based user status may indicate that the user is performing and/or participating in a particular activity, an emotion-based user status may indicate that the user is in a particular emotional state of mind, a media consumption user status may indicate that the user is watching and/or listening to a particular media content item, and the like. When a user selects a user status from the set of pre-determined user statuses, the user may be provided with one or more media content items associated with the selected user status. These media content items can include, for example, one or more background images, stickers, frames, filters, masks, and the like. The user can use the one or more media content items to create a visual status content item. The user can then, for example, publish the visual status content item to a social networking system. More details relating to the disclosed technology are provided below.

FIG. 1 illustrates an example system 100 including a content provider module 102, according to an embodiment of the present disclosure. The content provider module 102 can provide tools within a user interface with which a user can create one or more visual status content items. In various embodiments, the user can select a user status from a set of pre-determined user statuses. Each user status in the set of pre-determined user statuses can be associated with a set of media content items. Based on the user's selection of a particular user status, the user can be provided with the set of media content items associated with the user status. The set of media content items can include, for example, one or more background images, stickers, frames, filters, and/or masks associated with the selected user status. The user can utilize the set of media content items to generate and publish a visual status content item.

As shown in the example of FIG. 1, the content provider module 102 can include a content module 104, a follow module 106, an interaction module 108, a story module 110, and a visual status module 112. In some instances, the example system 100 can include at least one data store 114. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the content provider module 102 can be implemented in any suitable combinations.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be, in part or in whole, implemented as software running on one or more computing devices or systems, such as on a server system or a client computing device. In some instances, the content provider module 102 can be, in part or in whole, implemented within or configured to operate in conjunction with or be integrated with a social networking system (or service), such as a social networking system 630 of FIG. 6. Likewise, in some instances, the content provider module 102 can be, in part or in whole, implemented within or configured to operate in conjunction with or be integrated with a client computing device, such as the user device 610 of FIG. 6. For example, the content provider module 102 can be implemented as or within a dedicated application (e.g., app), a program, or an applet running on a user computing device or client computing system. The application incorporating or implementing instructions for performing functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 can be configured to communicate and/or operate with the at least one data store 114, as shown in the example system 100. The data store 114 can be configured to store and maintain various types of data. In some implementations, the data store 114 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 114 can store information that is utilized by the content provider module 102. For example, the data store 114 can store a set of pre-determined user statuses, one or more media content items associated with the various pre-determined user statuses, one or more visual status content items, and the like. It is contemplated that there can be many variations or other possibilities.

The content module 104 can be configured to provide users with access to content (e.g., media content items, such as visual status content items) that is available through a social networking system. In some instances, this content can include media content items that are posted in content feeds accessible through the social networking system. For example, the content module 104 can provide a first user with access to media content items through an interface that is provided by a software application (e.g., a social networking application) running on a computing device of the first user. The first user can also interact with the interface to post media content items to the social networking system. Such media content items may include text, images, audio, and videos, to name some examples. For example, the first user can submit a post to be published through the social networking system. The post may be (or include), for example, a visual status content item. In some embodiments, the post can include, or reference, one or more media content items.

In various embodiments, other users of the social networking system can access media content items posted by the first user. In one example, the other users can access the media content items by searching for the first user by user name through an interface provided by a software application (e.g., a social networking application, browser, etc.) running on their respective computing devices. In some instances, some users may want to see media content items posted by the first user in their respective content feed. To cause media content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all media content items that are posted by the first user can automatically be included in the respective content feed of the user. If the user decides that they no longer want to see content from the first user in their respective content feed, the user can select an option through the interface to unsubscribe from, or "unfollow", the first user. As a result, the follow module 106 can remove the association between the user and the first user so that media content items posted by the first user are no longer included in the content feed of the user.

In some instances, users may want to interact with posted media content items. For example, a user may want to endorse, or "like", a media content item. In this example, the user can select an option provided in the interface to like the desired media content item. The interaction module 108 can determine when a user likes a given media content item and can store information describing this relationship. The interaction module 108 can also determine when other forms of user interaction are performed and can store information describing the interaction (e.g., information describing the type of interaction, the identity of the user, the identity of the user that posted the media content item, and the media content item, to name some examples). For example, the user may want to post a comment in response to a media content item. In this example, the user can select an option provided in the interface to enter and post the comment for the desired media content item. The interaction module 108 can determine when a user posts a comment in response to a given media content item and can store information describing this relationship. Other forms of user interaction can include emoji-based reactions to a media content item (e.g., selecting an option that corresponds to a particular reaction emoji, e.g., happy, sad, angry, etc.) and re-sharing a media content item, for example.

In some embodiments, the story module 110 can provide an option that allows users to post their content as stories. In such embodiments, each user has a corresponding story feed in which the user can post content. When a user's story feed is accessed by another user, the story module 110 can provide content posted in the story feed to the other user for viewing. In general, content posted in a user's story feed may be accessible by any user of the social networking system. In some embodiments, content posted in a user's story feed may only be accessible to followers of the user. In some embodiments, user stories expire after a pre-defined time interval (e.g., every 24 hours). In such embodiments, content posted as a story in a story feed is treated as ephemeral content that is made inaccessible once the pre-defined time interval has elapsed. In contrast, content posted in a user (or follower) primary content feed can be treated as non-ephemeral content that remains accessible for a longer and/or an indefinite period of time.

In various embodiments, the visual status module 112 is used to create visual status content items. A visual status content item created by the visual status module 112 can be associated with a pre-determined user status, and can include one or more media content items associated with the pre-determined user status. More details regarding the visual status module 112 will be provided below with reference to FIG. 2.

Figure 2:
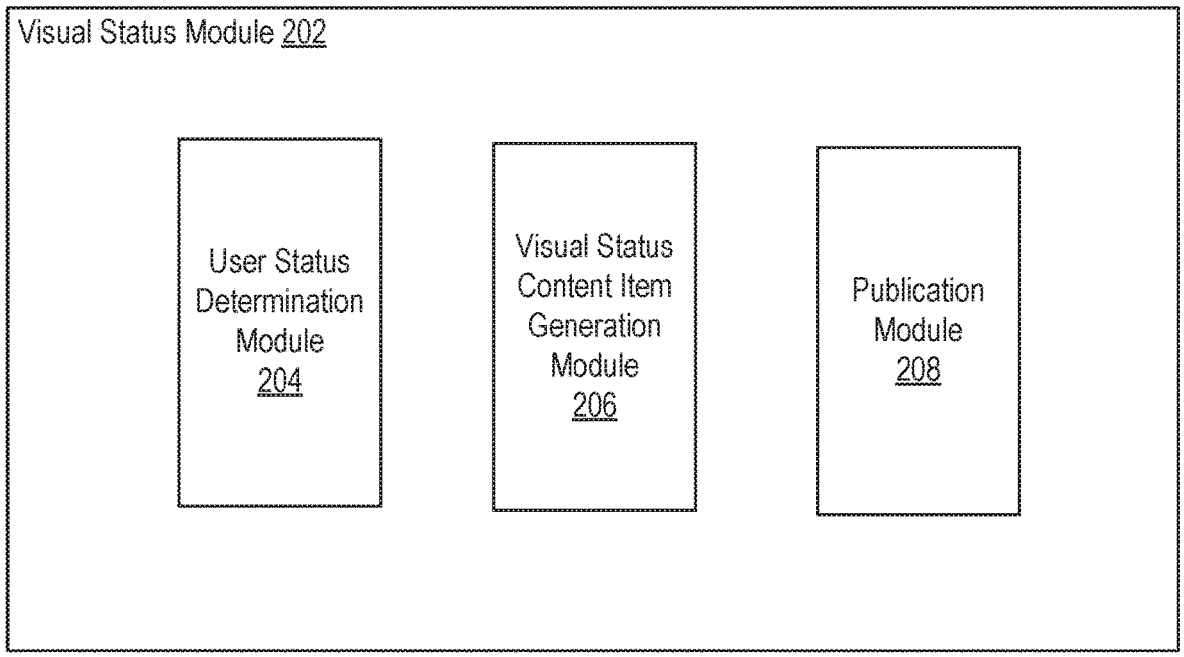
FIG. 2 illustrates an example visual status module, according to an embodiment of the present disclosure.

FIG. 2 illustrates an example visual status module 202 configured to generate and publish visual status content items, according to an embodiment of the present disclosure. In some embodiments, the visual status module 112 of FIG. 1 can be implemented as the visual status module 202. As shown in the example of FIG. 2, the visual status module 202 can include a user status determination module 204, a visual status content item generation module 206, and a publication module 208.

The user status determination module 204 can be configured to determine a user status for a user from a set of pre-determined user statuses. The set of pre-determined user statuses can comprise a plurality of pre-determined user statuses. Each user status may be indicative of a status or state of a user. For example, certain user statuses (e.g., location-based user statuses) may be associated with a particular location and may be indicative of the user being located at the particular location. In another example, certain user statuses (e.g., emotion-based user statuses) may be associated with a particular emotional state (e.g., happy, angry, sad, excited, tired, blessed, etc.). In yet another example, certain user statuses (e.g., media consumption user statuses) may be associated with a particular media content item (e.g., musical artist, album, and/or song, television program, movie, etc.) and may indicate that the user is currently consuming the media content item. In another example, certain user statuses may be associated with a particular activity or event and may be indicative of the user participating in the activity or event. Many variations are possible.

In certain embodiments, the user status determination module 204 can determine a user status for a user based on a selection of a user status by the user from the set of pre-determined user statuses. For example, the user may be provided with a user interface within which the user can browse and/or search through the set of pre-determined user statuses, and select one that is relevant to the user's current status. For example, the user can enter one or more search terms to identify a relevant user status from the set of pre-determined user statuses. In certain embodiments, the set of pre-determined user statuses may be divided into various categories. For example, the set of pre-determined user statuses may be divided into, inter alia, a set of location-based user statuses, a set of emotion-based user statuses, and a set of media consumption user statuses. The user interface can allow the user to browse and/or search through the various user status categories to identify a relevant user status.

In certain embodiments, the user status determination module 204 can identify one or more user statuses that may be relevant to a user based on contextual information. Contextual information can include, for example, location information associated with the user, a set of interests associated with the user, time and/or date information, or any other information that may be used to identify user statuses. For example, the user status determination module 204 can receive location information associated with a user, and identify one or more pre-determined user statuses associated with the user's location. In another example, the user status determination module 204 can receive location information associated with a user and date and time information to determine that the user may be at an event that is scheduled for that time and location, and can identify one or more pre-determined user statuses associated with the event. In yet another example, the user status determination module 204 can receive location information associated with a user and date and time information to determine that a user may be participating in a particular activity (e.g., working, studying, jogging, hiking, traveling, etc.) and can identify one or more pre-determined user statuses associated with that activity. The user status determination module 204 can provide the user with one or more visual status recommendations based on the one or more pre-determined user statuses that have been identified using the contextual information. Such recommendations may indicate to the user that the user can create one or more visual status content items based on the user's current status and may encourage the user to create such visual status content items. In certain embodiments, the user status determination module 204 can rank the one or more visual status recommendations based on a determination of which visual status recommendations are most likely to be relevant and/or of interest to the user. The one or more visual status recommendations can be provided to the user based on the ranking.

The visual status content item generation module 206 can be configured to provide a user interface presented on a user computing device within which a user can create a visual status content item. As discussed above, a visual status content item may be associated with a particular user status, and may include one or more media content items associated with the user status. Once a user status has been determined for a user (e.g., automatically or based on a selection by the user), the visual status content item generation module 206 can provide, via a user interface, the user with a set of media content items associated with the user status. The user can use the user interface to interact with the set of media content items to create a visual status content item. The set of media content items may include, for example, one or more background images, stickers, frames, masks, filters, or other visual elements associated with the user status. For example, if the user has selected a user status indicating that the user is watching a particular television show or listening to a particular song, the user can be provided with a set of media content items associated with the television show or the song. Or if the user has selected a user status indicating that the user is about to get on an airline flight, the user may be provided with media content items that allow the user to share the status and/or current location of their flight. In yet another example, if the user has selected a user status indicating that the user is at a particular location or event, the user can be provided with media content items associated with the location or event (e.g., a sticker displaying the name of the location or event, a background image of a map of the location, a sticker displaying the weather and/or time at the location or event, etc.).

In certain embodiments, the visual status content item generation module 206 may provide a user with the ability to add one or more user-created media content items to a visual status content item. For example, the user may be provided with the ability to use a camera on the user's computing device to capture an image or video to be used within the visual status content item (e.g., as a background image or background video). As discussed above, it may be the case that the user's current status may not be easily portrayed in a compelling or attractive image. As such, in certain embodiments, the user may be provided with the ability to capture an image or video, and a blurred version of the captured image or video may be used in the visual status content item. For example, the blurred image can be used as a background image for the visual status content item. The blurred image may provide some context or indication of what the user is currently doing.

The publication module 208 can be configured to post (i.e., publish) media content items, such as visual status content items, to, for example, a social networking system. In some embodiments, users have an option to share media content items as stories in a story feed or in one or more other content feeds. In some embodiments, content included in a user's story feed is treated as ephemeral content. That is, content included in the story feed can be available to other users (e.g., followers of the user) for a limited duration of time, i.e., the content is temporarily available. In some embodiments, content included in other content feeds may be treated as non-ephemeral content. That is, the content can be available to the other users for some longer or indefinite duration of time. These time periods can be pre-defined by the social networking system or, in some embodiments, by the user posting the media content item. In some embodiments, a media content item posted in a non-ephemeral content feed can be available through the social networking system until the media content item is deleted by the user. In various embodiments, a user can publish a visual status content item to his or her story feed or to one or more other non-ephemeral content feeds. As described above, a visual status content item can include one or more media content items associated with a particular user status. In various embodiments, when a user posts and/or publishes a visual status content item, multiple content items contained in the visual status content item may be flattened into a single media content item, such as an image or a video. In other embodiments, the visual status content item may be published and maintain the various media content items contained therein as distinct content items contained within the visual status content item.

Figure 3A:
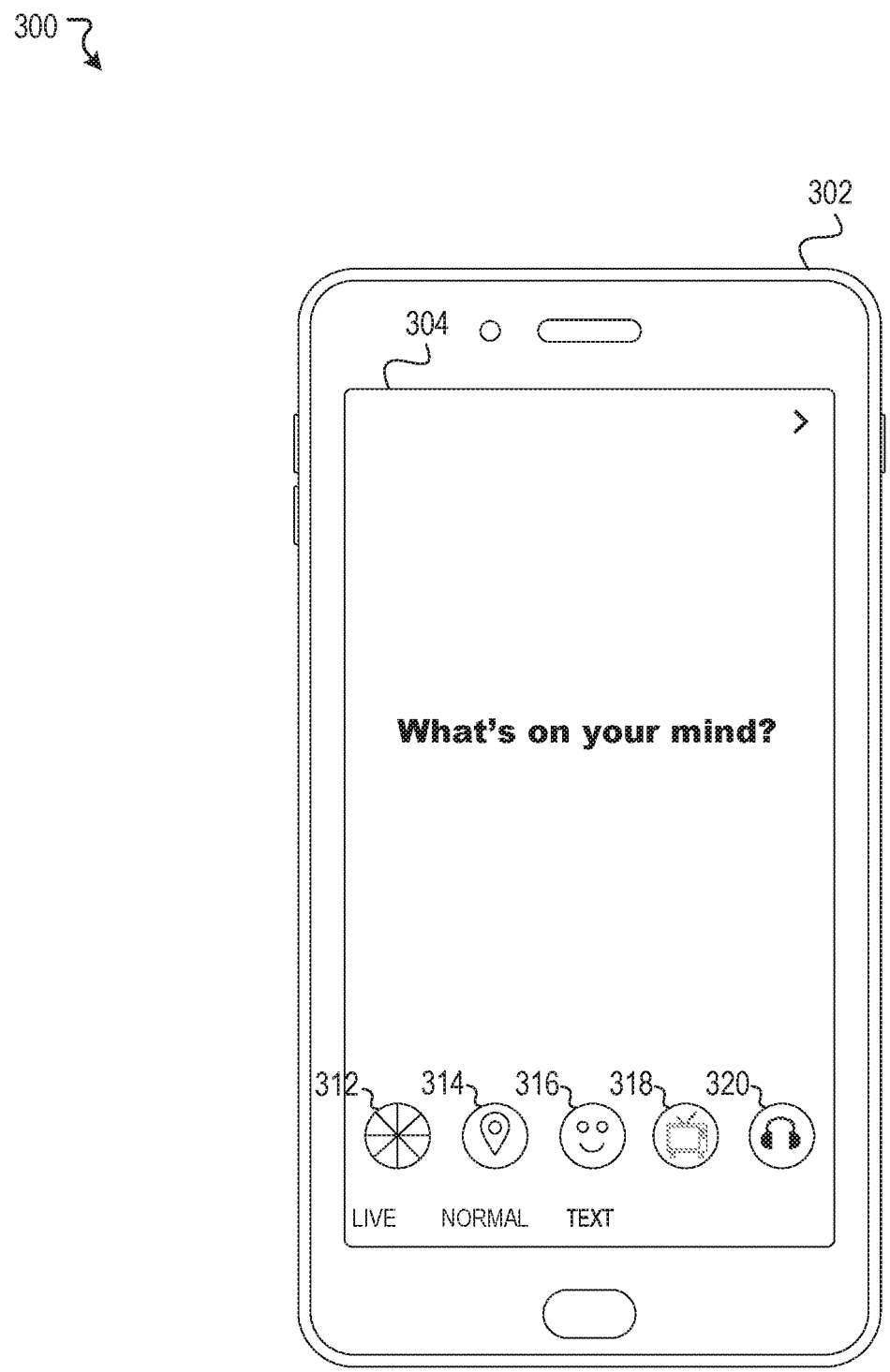
FIGS. 3A-3E illustrate example user interfaces associated with generating content items, according to an embodiment of the present disclosure.

FIG. 3A illustrates an example scenario 300 associated with determining a user status from a set of pre-defined user statuses, according to an embodiment of the present disclosure. The example scenario 300 includes an interface 304 that is presented through a display screen of a computing device 302. In various embodiments, the interface 304 may be provided through an application (e.g., a web browser, a social networking application, messenger application, etc.) running on the computing device 302 that is configured to interact with a social networking system.

In FIG. 3A, the interface 304 displays a free-form text entry interface within which the user can enter text. The user can select a background color icon 312 to change a background color for the text. The interface 304 also includes various user status category icons that the user can select in order to specify a user status. In the example interface 304, the user status category icons include a location icon 314, an emotion icon 316, a watching icon 318, and a listening icon 320.

Figure 3B:

In FIG. 3B, the user has selected the location icon 314. The interface 304 displays a location box 330 that the user can select to identify the user's current location. Selection of the location box 330 may allow the user to enter text in order to identify the user's current location. Once the user has entered text, the user may be presented with a list of location-based user statuses (e.g., a list of locations) that match the entered text and for which media content items are available. Selection of the location box 330 may also present a pre-populated list of locations that have been identified based on location information associated with the user (e.g., the user's GPS coordinates as determined by the user's computing device). If the user selects and/or identifies a particular location, a user status can be determined based on the location. For example, the user's status may indicate that the user is at the particular location, or the user's status may indicate that the user is participating in a particular activity or event at the location. The user can be provided with a set of media content items based on the user's status so that the user can create a visual status content item using the set of media content items.

Figure 3C:
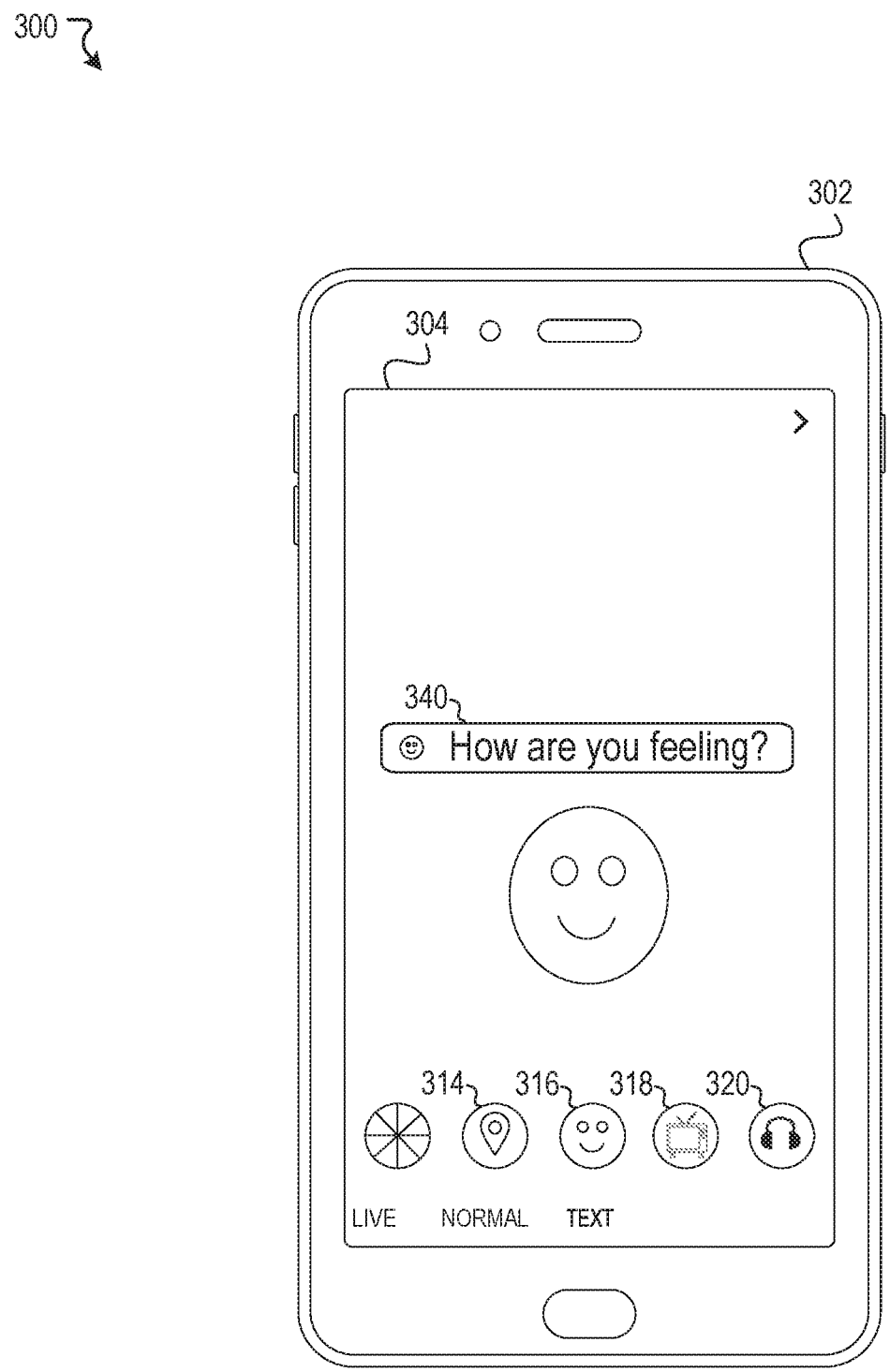

In FIG. 3C, the user has selected the emotion icon 316. The interface 304 displays an emotion box 340 that the user can select to identify an emotion that the user is currently feeling or experiencing. Selecting the emotion box 340 may present the user with a pre-populated list of emotions from which the user can select in order to create a visual status content item. Once the user selects a particular emotion from a set of pre-determined emotions, the user can be provided with a set of media content items associated with the selected emotion. The user can create a visual status content item using the set of media content items.

Figure 3D:
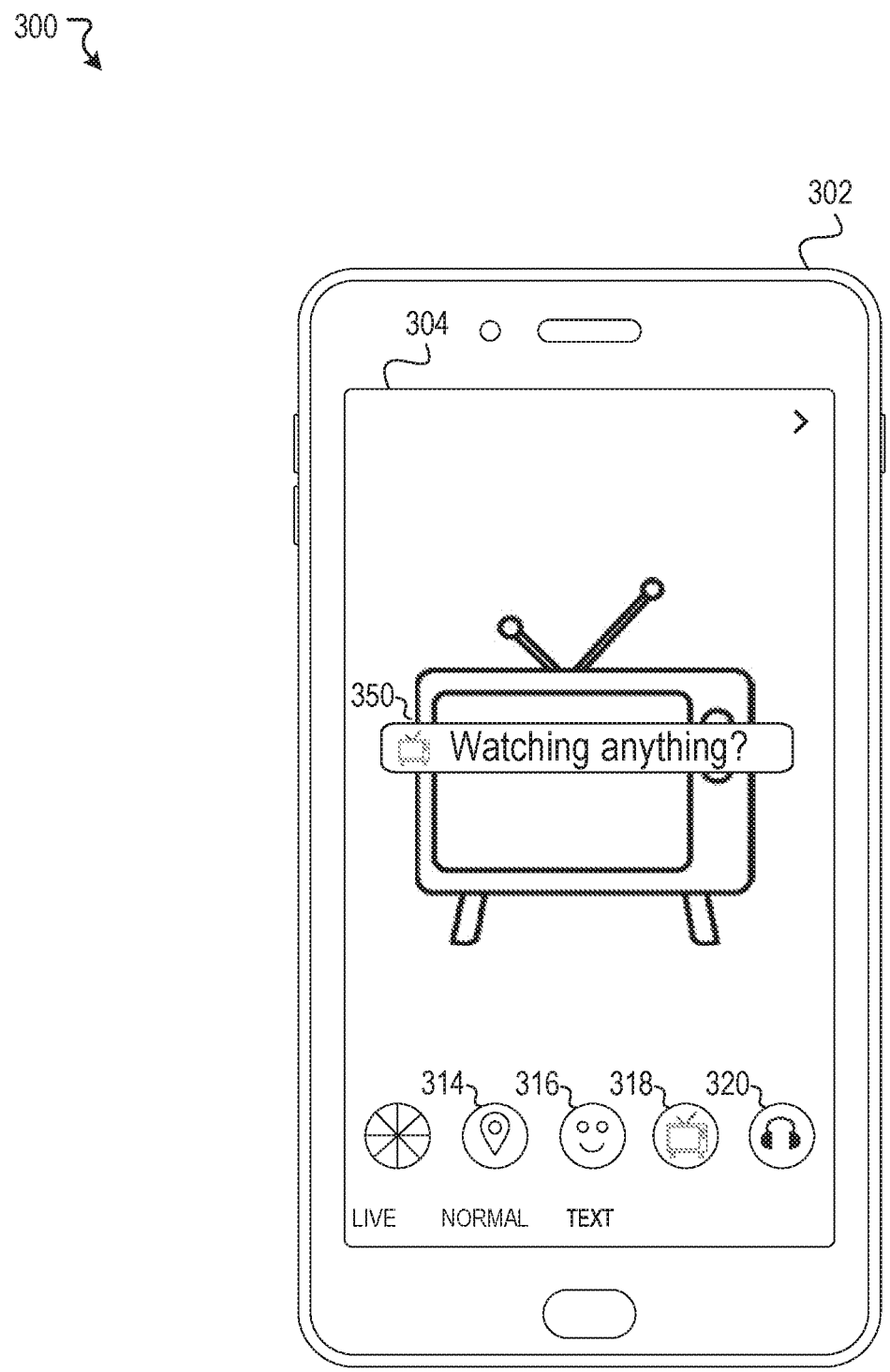

In FIG. 3D, the user has selected the watching icon 318. The interface 304 displays a watching box 350 that the user can select to identify a media content item that the user is currently watching. Selecting the watching box 350 can allow the user to enter a textual query in order to identify a media content item that the user is currently watching. Upon entering the textual query, the user may be presented with a list of search results comprising one or more media consumer user statuses (e.g., a list of television programs or movies or other media content items). Selection of the watching box 350 may also present a pre-populated list of media content items that the user can select from. In certain embodiments, the list of media content items may be ordered and/or pre-populated based on contextual information. For example, if it is determined that the user is creating the visual status content item on a particular date at a particular time, the list of media content items may include and/or uprank media content items (e.g., television programs, sporting event broadcasts, etc.) that are airing at that particular date and time. Or in other embodiments, the list of media content items may include and/or uprank media content items that are popular or trending. Once the user identifies a particular media content item that the user is watching, the user can be provided with a set of media content items associated with the identified media content item. The user can create a visual status content item using the set of media content items. In certain embodiments, an application can automatically identify a media content item that the user is watching, and the interface 304 can be automatically pre-populated with media content items associated with the media content item that the user is watching. For example, if the user is watching a particular movie on the computing device 302, the interface 304 can be pre-populated with media content items associated with that movie. The user can also be provided with the ability to modify the pre-populated media content items or add additional media content items associated with the movie.

Figure 3E:

In FIG. 3E, the user has selected the listening icon 320. The interface 304 displays a listening box 360 that the user can select to identify a media content item that the user is currently listening to. Selecting the listening box 360 can allow the user to enter a textual query in order to identify a media content item that the user is currently listening to. Selection of the listening box 360 may also present a pre-populated list of media content items (e.g., songs, albums, artists) that the user can select from. In certain embodiments, the interface 304 may be pre-populated with media content items associated with a particular media content item that has been automatically identified. For example, if the user is listening to a song on the computing device 302, the interface 304 can be pre-populated with media content items associated with that song. The user can also be provided with the ability to modify the pre-populated media content items or add additional media content items associated with the song. Alternatively, if the user identifies a particular media content item that the user is listening to, the user can be provided with a set of media content items associated with the identified media content item. The user can create a visual status content item using the set of media content items.

Figure 4A:
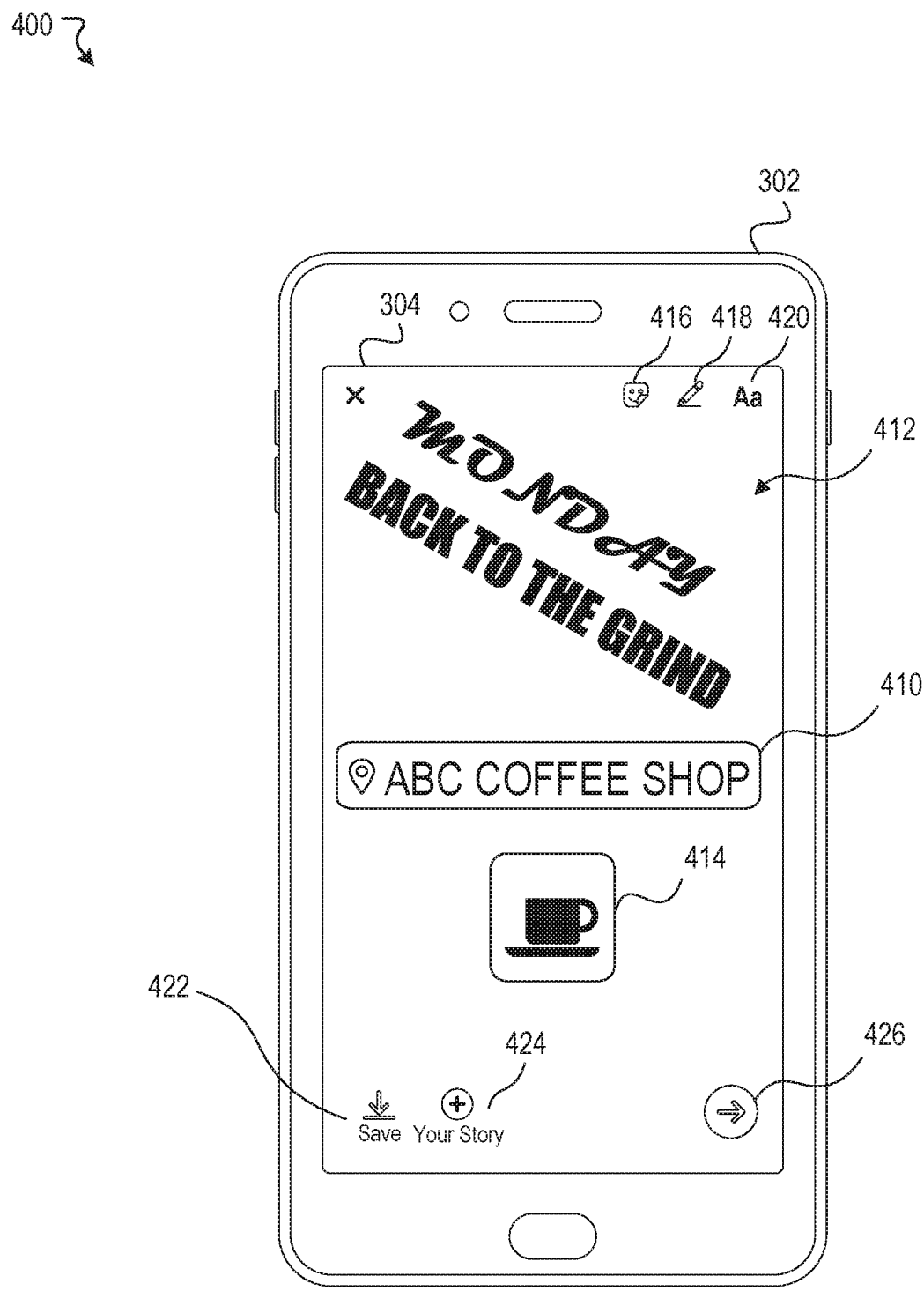
FIGS. 4A-4B illustrate example user interfaces associated with generating content items, according to an embodiment of the present disclosure.

FIG. 4A illustrates an example scenario 400 associated with generating a visual status content item, according to an embodiment of the present disclosure. The example scenario 400 includes the interface 304 depicted on the computing device 302 that were discussed above in FIGS. 3A-3E. In FIG. 4A, the user has used the location box 330 from FIG. 3B to indicate that the user is at "ABC Coffee Shop." Based on the user's identification of his or her location, the user has been provided with various media content items associated with the user's location-based user status. The media content items include a background image 412, which includes the text "MONDAY BACK TO THE GRIND." The background image 412 may have been selected based on the user's location, and may have been selected based on other contextual information. In this example, the contextual information indicates that the day is Monday and that the user is an employee of ABC Coffee Shop. As a result, the background image indicates that it is currently Monday. Furthermore, the phrase "back to the grind" may indicate that the user works at ABC Coffee Shop, and the user is returning to his or her place of work due to the fact that it is currently Monday. In various embodiments, the user may be provided with multiple background images associated with the user's user status and the user can select a background image.

The media content items also include a sticker 410 indicating the user's current location, and another sticker 414 associated with the user's current location. The user can use the user interface 304 to interact with the stickers 410, 414 in various ways. For example, in various embodiments, the user can use a first gesture (e.g., a dragging gesture) to move the stickers from one position to another, a second gesture (e.g., a pinching or spreading gesture) to change the size of the stickers, or a third gesture (e.g., a two-fingered rotating gesture) to rotate the stickers. The user interface 304 also includes a sticker icon 416 that the user can select to access additional stickers to add to the visual status content item, a drawing icon 418 that the user can select to draw on the visual status content item, and a text icon 420 that the user can select to add text to the visual status content item. A save icon 422 allows the user to save the visual status content item (e.g., to a storage space associated with the user's account and/or locally to the computing device 302), a "your story" icon 424 allows the user to publish the visual status content item to his or her story feed (e.g., a feed of ephemeral content items), and a next icon 426 allows the user to publish the visual status content item to various content feeds.

Figure 4B:

In FIG. 4B, the user has used the emotion box 340 of FIG. 3C to indicate that the user is feeling "tired." Based on the user's identification of his or her emotion-based user status, the user has been provided with a background image 452 which visually expresses the user's user status. It can be appreciated that by providing users with these tools and features, users may be given the ability to create visually appealing visual status content items based on user statuses that, under conventional approaches, may not have been amenable to interesting visual representation.

Figure 5:
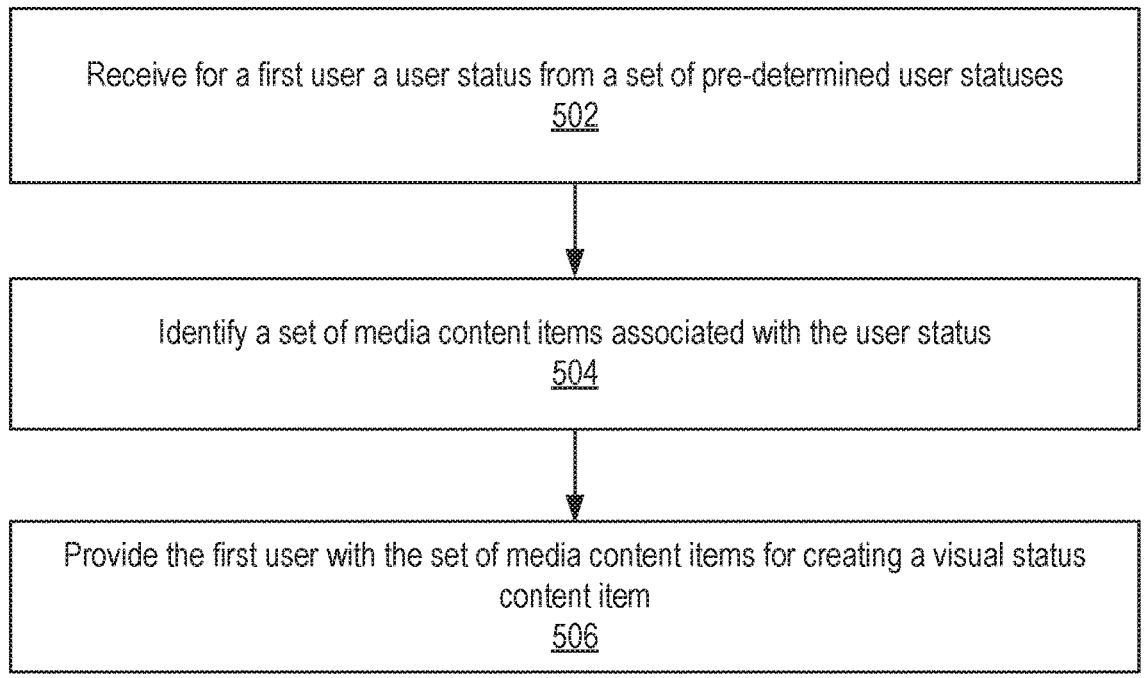
FIG. 5 illustrates an example method associated with generating visual status content items, according to an embodiment of the present disclosure.

FIG. 5 illustrates an example method 500 associated with generating visual status content items, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can receive, for a first user, a user status from a set of pre-determined user statuses. At block 504, the example method 500 can identify a set of media content items associated with the user status. At block 506, the example method 500 can provide the first user with the set of media content items for creating a visual status content item.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
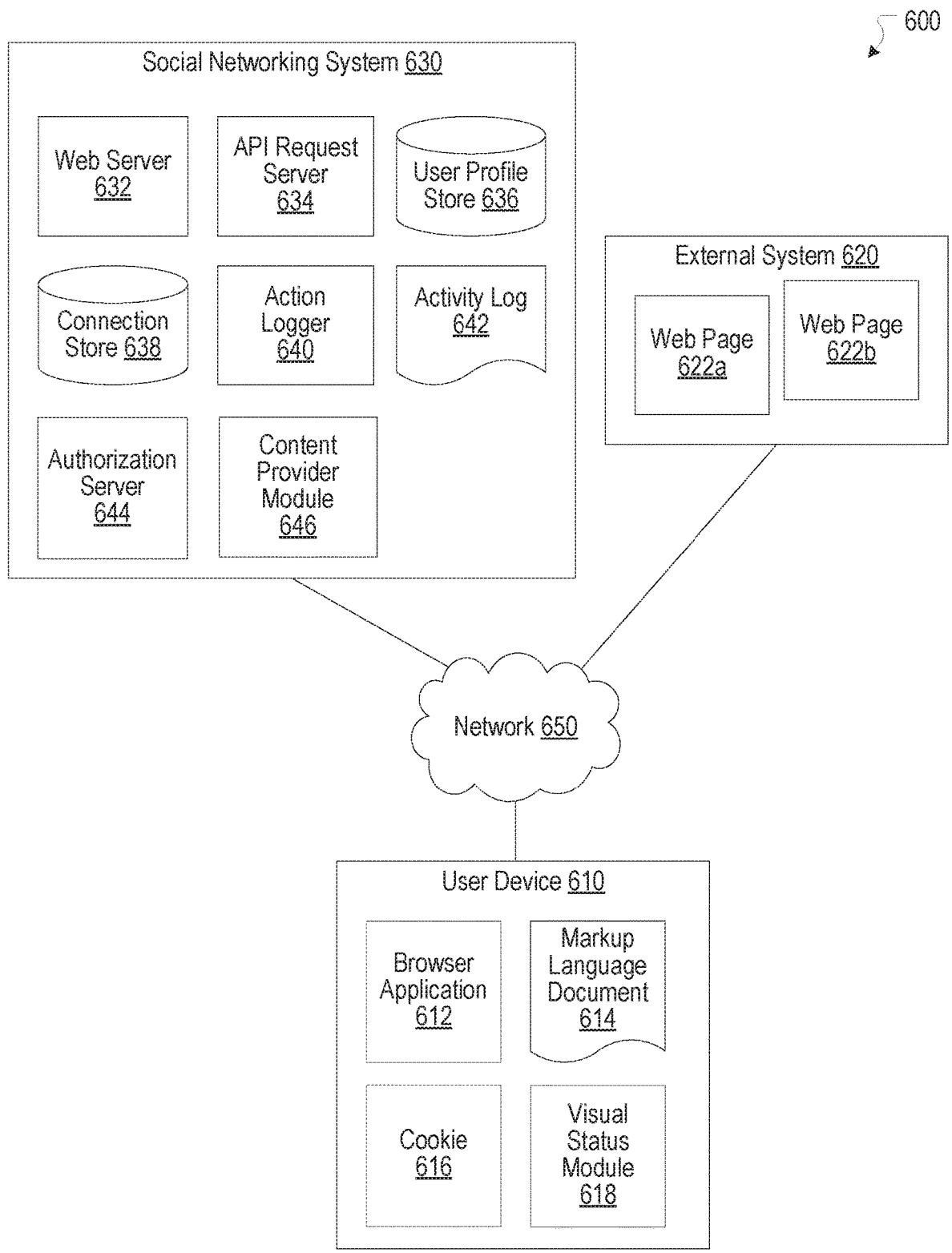
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102, as discussed in more detail herein. As discussed previously, it should be appreciated that there can be many variations or other possibilities. For example, in some embodiments, one or more functionalities of the content provider module 646 can be implemented in the user device 610. For example, the user device 610 can include a visual status module 618. The visual status module 618 can, for example, be implemented as the visual status module 112, as discussed in more detail herein. As discussed previously, it should be appreciated that there can be many variations or other possibilities.

Hardware Implementation

Figure 7:
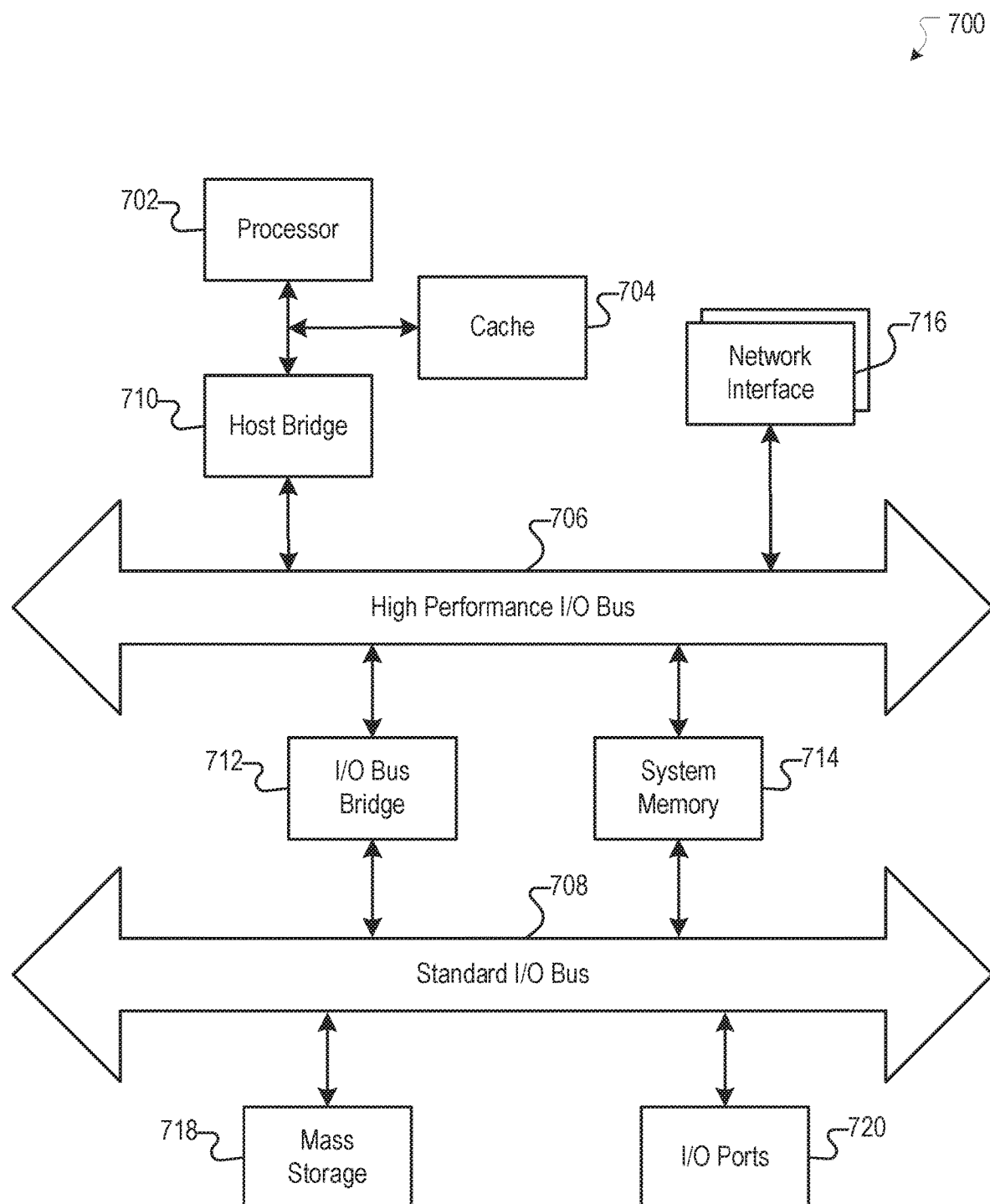
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a computing system, for a first user, a user status from a set of pre-determined user statuses, wherein the set of pre-determined user statuses is associated with a plurality of user status category icons in a user interface for selection by the first user to specify the user status;
identifying, by the computing system, a set of media content items associated with the user status;
providing, by the computing system, the first user with the set of media content items for creating a visual status content item; and
providing, by the computing system, the first user with a feature to add one or more user-created media content items to apply to the visual status content item, wherein the one or more user-created media content items include at least one of an image or a video captured by a computing device of the first user.

2. The computer-implemented method of claim 1, wherein the set of media content items comprise at least one of a background image, a sticker, a frame, a mask, or a filter associated with the user status.

3. The computer-implemented method of claim 1, wherein the set of pre-determined user statuses comprise one or more location-based user statuses.

4. The computer-implemented method of claim 1, wherein the set of pre-determined user statuses comprise one or more emotion-based user statuses.

5. The computer-implemented method of claim 1, wherein the set of pre-determined user statuses comprise one or more media consumption user statuses.

6. The computer-implemented method of claim 5, further comprising automatically identifying a first media content item being consumed by the first user.

7. The computer-implemented method of claim 6, further comprising providing the first user with a set of media content items associated with the first media content item.

8. The computer-implemented method of claim 5, further comprising pre-populating a list of media content items based on contextual information, wherein the contextual information comprises date and time information.

9. The computer-implemented method of claim 1, further comprising receiving a visual status content item comprising at least one media content item from the set of media content items.

10. The computer-implemented method of claim 9, further comprising publishing the visual status content item to an ephemeral story feed associated with the first user.

11. A system comprising:
at least one processor; and
a memory storing instructions that, when executed by the at least one processor, cause the system to perform a method comprising:
receiving, for a first user, a user status from a set of pre-determined user statuses, wherein the set of pre-determined user statuses is associated with a plurality of user status category icons in a user interface for selection by the first user to specify the user status;
identifying, a set of media content items associated with the user status;
providing, the first user with the set of media content items for creating a visual status content item; and
providing, the first user with a feature to add one or more user-created media content items to apply to the visual status content item, wherein the one or more user-created media content items include at least one of an image or a video captured by a computing device of the first user.

12. The system of claim 11, wherein the set of media content items comprise at least one of a background image, a sticker, a frame, a mask, or a filter associated with the user status.

13. The system of claim 11, wherein the set of pre-determined user statuses comprise one or more location-based user statuses.

14. The system of claim 11, wherein the set of pre-determined user statuses comprise one or more emotion-based user statuses.

15. The system of claim 11, wherein the set of pre-determined user statuses comprise one or more media consumption user statuses.

16. A non-transitory computer-readable storage medium including instructions that, when executed by at least one processor of a computing system, cause the computing system to perform a method comprising:
 receiving, for a first user, a user status from a set of pre-determined user statuses, wherein the set of pre-determined user statuses is associated with a plurality of user status category icons in a user interface for selection by the first user to specify the user status;
 identifying, a set of media content items associated with the user status;
 providing, the first user with the set of media content items for creating a visual status content item; and
 providing, the first user with a feature to add one or more user-created media content items to apply to the visual status content item, wherein the one or more user-created media content items include at least one of an image or a video captured by a computing device of the first user.

17. The non-transitory computer-readable storage medium of claim 16, wherein the set of media content items comprise at least one of a background image, a sticker, a frame, a mask, or a filter associated with the user status.

18. The non-transitory computer-readable storage medium of claim 16, wherein the set of pre-determined user statuses comprise one or more location-based user statuses.

19. The non-transitory computer-readable storage medium of claim 16, wherein the set of pre-determined user statuses comprise one or more emotion-based user statuses.

20. The non-transitory computer-readable storage medium of claim 16, wherein the set of pre-determined user statuses comprise one or more media consumption user statuses.

* * * * *